United States Patent [19]

Brown et al.

[11] Patent Number: 5,577,321
[45] Date of Patent: Nov. 26, 1996

[54] METHOD OF PROPELLER FABRICATION

[75] Inventors: Rodney L. Brown; Lance P. Morris, both of Redmond, Wash.

[73] Assignee: Hydroplanes, Inc., Tukwila, Wash.

[21] Appl. No.: 252,672

[22] Filed: Jun. 2, 1994

[51] Int. Cl.$^6$ ................................ B23P 15/00
[52] U.S. Cl. ............... 29/889.6; 29/889.7; 29/527.6
[58] Field of Search ........................... 29/889.6, 889, 29/889.7, 460, 527.6; 416/213 R

[56] References Cited

U.S. PATENT DOCUMENTS

| | | | |
|---|---|---|---|
| 4,058,880 | 11/1977 | Hughey | 29/156.8 |
| 4,555,835 | 12/1985 | Buzzi et al. | 29/156.8 |
| 4,573,876 | 3/1986 | Egan et al. | 416/213 R |

FOREIGN PATENT DOCUMENTS

| | | |
|---|---|---|
| 113472 | 7/1983 | European Pat. Off. . |
| 0262493 | 10/1990 | Japan . |
| 198172 | 11/1967 | U.S.S.R. . |

*Primary Examiner*—Irene Cuda
*Attorney, Agent, or Firm*—R. Reams Goodloe, Jr.

[57] ABSTRACT

A method of fabricating propellers including a number of spiral segments of a hub each having a corresponding blade portion are integrally formed by press forging. These spiral segments are then electron beam welded together to form a propeller. To ensure maximum weld strength, spiral segments are provided, which results in a longer weld seam. In one embodiment, the shaft is friction welded to the front of the propeller, a stud is welded to a rear end of the propeller, and the stud is machined to form a hydrodynamic end cap for the propeller.

9 Claims, 5 Drawing Sheets

METHOD OF PROPELLER FABRICATION

FIELD OF INVENTION

This invention relates to propellers, and to a method for manufacture thereof. More particularly, the invention relates to a method for manufacturing high strength marine propellers wherein the propellers have each of their blade portions separately formed for greater strength and for better operational performance, and to a method of attachment of such propellers to a driving shaft.

BACKGROUND OF THE INVENTION

Marine propellers have traditionally been made in a one piece casting process. In such a process, a metal alloy selected for its strength, as well as its desired combination of erosion and corrosion resistant properties, is poured into a mold and cast into the generally desired shape for the propeller. The casting is then machined to the desired final shape.

More recently, some marine propellers have been produced by joining a propeller hub and a plurality of propeller blade blanks. The blade portions each have an inner attachment portion suitable for attachment to the hub. Typically in such a process, the identical blade portions are separately cast, and later each is welded or brazed into position around the hub.

With respect to high speed propellers of the type that is of interest to us, the problem with such heretofore used casting processes known to us is that the propellers must have relatively thick blade profiles to ensure adequate strength. Consequently, an undesirable amount of motor horsepower is consumed in simply driving the propeller through the water.

One attempt to improve on such prior art propellers and their production methods is set forth in U.S. Pat. No. 4,555,835 issued on Dec. 3, 1985 to to Buzzi et al for PROCESS FOR PRODUCING PROPELLERS. Buzzi provides for a propeller blade and a corresponding segment of a propeller hub to be press forged. The linear mating surfaces which are provided parallel the driving shaft along the hub portion of the propeller segments are then beveled. The propeller segments are subsequently joined using filler weldment in a generally V-groove shaped joint which is formed linearly along the hub from front to rear thereof.

Although Buzzi discloses a process that results in an increase in individual propeller blade strength, we have found that improvements in hub strength are still desirable. Also, a reduction in the size of the heat affected welding zone would be desirable in order to reduce the potential for propeller blade failure by fatigue stress along the welded portions of the hub.

SUMMARY OF THE INVENTION

We have now invented, and disclose herein, a novel, improved marine propeller and a method of manufacturing such a propeller which does not have the above-discussed drawbacks common to those somewhat similar processes used heretofore and of which we are aware. Unlike the propellers heretofore available, our propeller design is simple, of high strength, relatively straightforward to manufacture, and otherwise superior to those heretofore used or proposed. In addition, it provides a significant additional measure of strength to weight, particularly in the hub construction, as well as with respect to required blade thickness, when compared to heretofore available propeller designs known to us.

We have developed a method for fabrication of propellers of a selected shape and with N individual propeller blades, wherein each of the propeller blades has a front and a rear and a longitudinal axis therebetween, wherein the propellers are comprised of N hub segment portions. The method involves press forging blanks of each of the N blades within a press forging mold to a shape at least roughly corresponding to the desired final size and shape of the blades, with each of the blanks having a hub portion with integral blade portion. Then the hub portions of each blank are machined into finished hub segments. The hub segments each comprise a spiraling, angular segmented shape having a first face and a second face located at a preselected segment angle alpha ($\alpha$) from the first face at any location along the longitudinal axis of the propeller. The first face of the angular segmented shape of said hub section rotates about the longitudinal axis X of the propeller by an angle beta ($\beta$) from the rear to the front of the propeller. After machining, the hub segments are secured in a closely spaced relationship for welding each of N hub segments to the hub sections adjacent thereto in the finished propeller. Then, the welding of adjacent hub sections is preferably accomplished by electron beam welding. Ideally the method includes maintaining the angle alpha approximately equal if not identical at all longitudinal positions in each of the N hub segments. Also, we prefer to keep the angle alpha ($\alpha$) approximately equal to the angle beta ($\beta$).

The propeller produced by this method is of superior strength when compared to propellers manufactured by other heretofore practiced fabrication methods known to us. Additionally, the method can be further improved by friction welding of the driving shaft to the propeller produced by the method just described.

OBJECTS, ADVANTAGES, AND FEATURES OF THE INVENTION

From the foregoing, it will be apparent to the reader that one important and primary object of the present invention resides in the provision of a novel, improved marine propeller and a method of manufacturing the same.

Other important but more specific objects of the invention reside in providing a method for manufacture of a propeller as described herein:

which has high blade strength in comparison to cast propeller blades of similar thickness;

which has a large surface area high strength joint between adjacent hub portions, to thereby provide a means for safely and reliably coupling a set of hub portions to provide a very high strength propeller hub;

which in comparison to other prior art manufacturing methods known to us is highly unsusceptable to fatigue stress cracking under severe of operating conditions;

which has a strong hub to shaft joint;

which can be manufactured in a simple, straightforward manner; and, which reduces the amount of machine time necessary to cut off un-needed material.

Other important objects, features, and additional advantages of our invention will become apparent to the reader from the foregoing and the appended claims and as the ensuing detailed description and discussion proceeds in conjunction with the accompanying drawing.

BRIEF DESCRIPTION OF THE DRAWING

The improved propeller and method of manufacturing the same, and the features and advantages thereof, will be best understood upon review of the following detailed description of specific embodiments of the invention with particular reference to the accompanying drawing, wherein.

DETAILED DESCRIPTION

Figure 1:
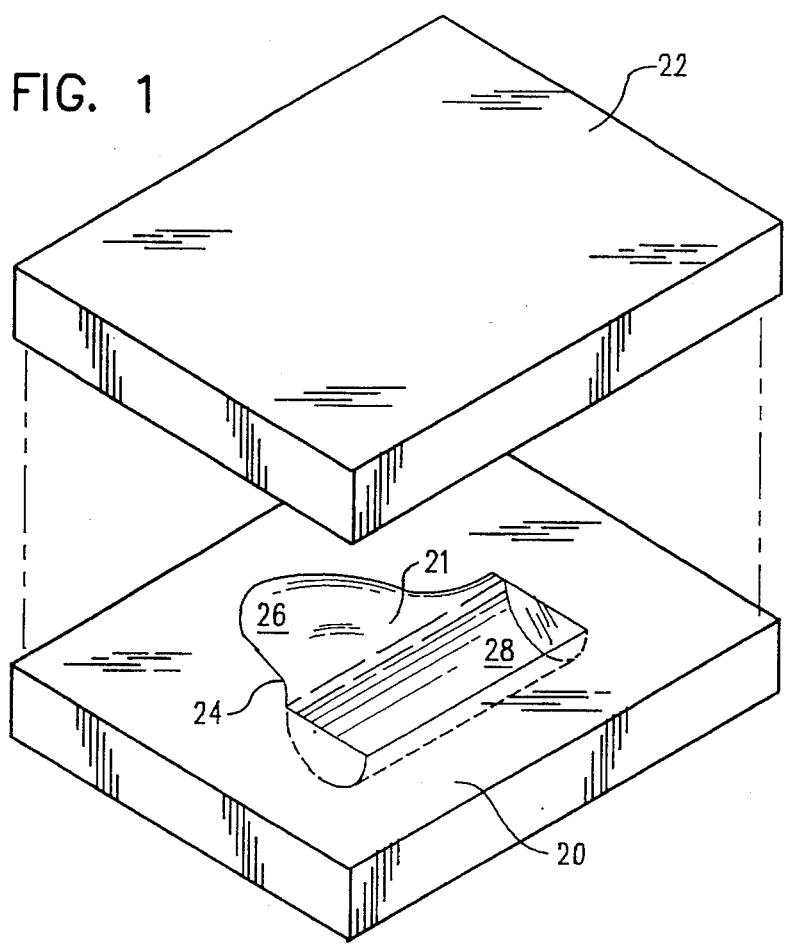
FIG. 1 is a perspective view of a mold and a complimentary dolly suitable for press forging a propeller blade blank.

Referring now to the drawing and to FIG. 1 in particular, a press-forging type mold 20 having recessed impressions 21 and a complimentary dolly 22 are provided for press forging a blank 24 of suitable size and shape which at least roughly corresponds to the size and shape of a specific segment of a desired fully assembled propeller. Press forging enables the grain structure in the blade portion 26 and integrally formed hub portion 28 of blank 24 to be aligned as desired so as to enable production of a propeller, and particularly blade portion 26, which has improved strength, when compared to the similar parts made by conventional propeller blade casting methods. In order to maximize the strength advantages afforded by the press forging technique, one hub segment 30 is normally provided per blade portion 26.

Figure 2:
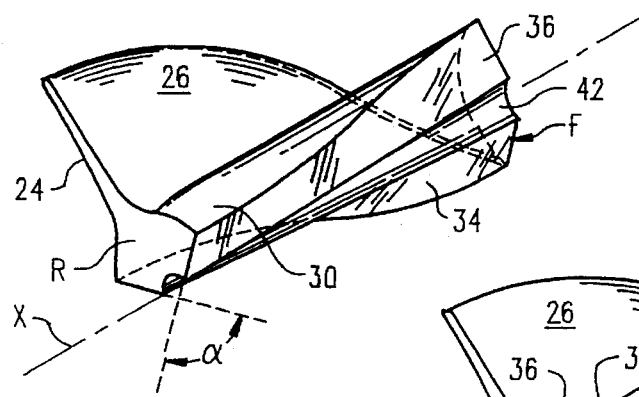
FIG. 2 is a perspective view of a propeller blade blank portion with a machined spiral shaped hub segment.
Figure 3:
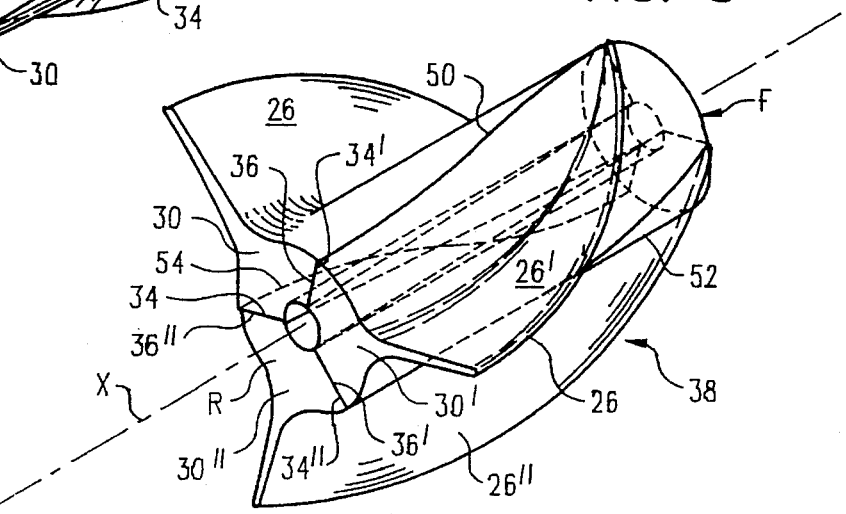
FIG. 3 is a perspective view of three propeller blade portions each with integrally formed spiral hub segments, each similar to that shown in FIG. 2 above, now shown fully assembled.

One aspect of our improved propeller assembly method is illustrated in FIGS. 2 and 3. In FIG. 2, a blade portion 26 is provided with machined hub segment 30. The hub segment 30 is produced by machining the hub portion 28 of blank 24 into a desired shape. As shown here, hub segment 30 is finished by precision machining hub segment 30 into a spiraling, angular segmented shape with integral blade 26, where the segmented shape rotates about the longitudinal axis X of the hub segment 30.

Referring to FIG. 3 it can be appreciated that the total hub section 32 is comprised of three complimentary hub segments 30. As will be further described hereinbelow, a plurality of machined blanks 24 (including spiral hub segments 30) are joined into a total hub section 32, preferably by electron beam welding.

Figure 4:
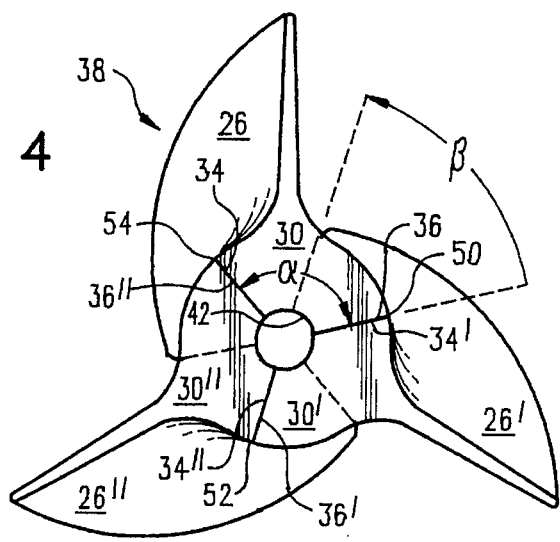
FIG. 4 is a rear end view of the propeller first shown in FIG. 3.
Figure 5:
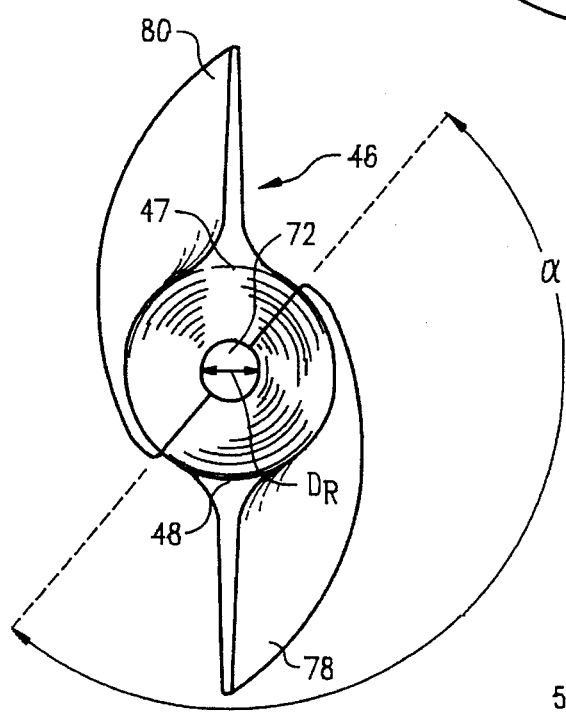
FIG. 5 is a rear end view of a second embodiment of the invention, showing a two bladed propeller, similar to the propeller first shown in FIGS. 3 and 4, but having only two integrally formed spiral hub segments and two blades.
Figure 6:
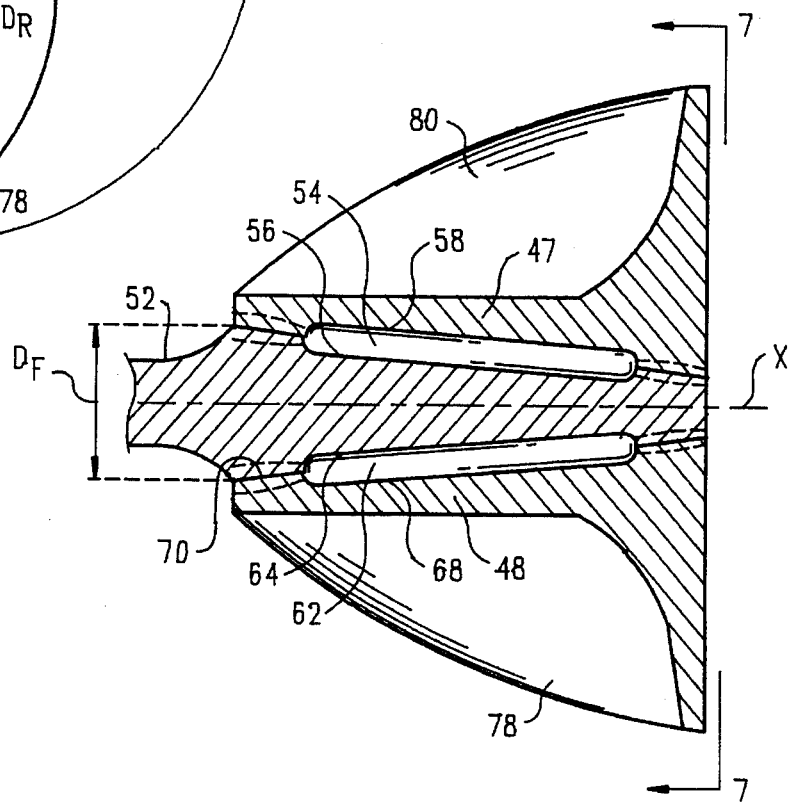
FIG. 6 is a longitudinal cross-sectional view of the embodiment of the propeller first depicted in FIG. 5, taken vertically and lengthwise along a propeller and its driving shaft, showing an integral tapered drive shaft, and also showing chambers provided for electron beam welding of the tapered shaft to the hub.
Figure 7:
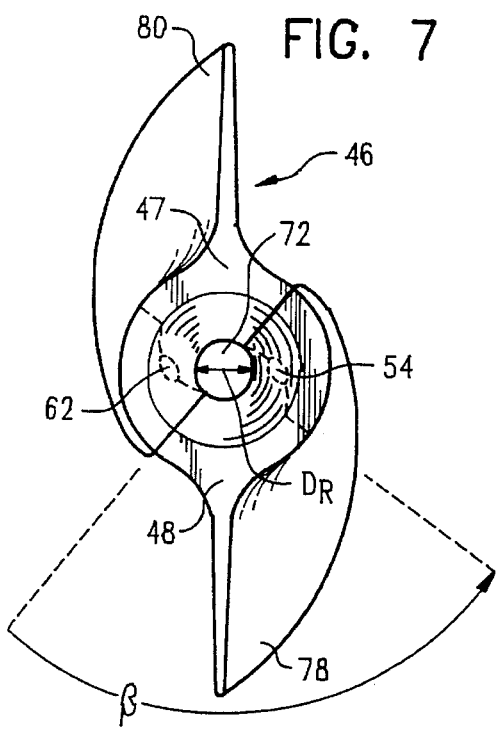
FIG. 7 is a vertical end view similar to that provided in FIG. 5 above and taken along line 7—7 of FIG. 6, looking forward shaftwise along the propeller, and showing in hidden lines the tapered shaft inserted into the propeller and showing how the chambers for electron beam welding are included in the interior of the hub segments and shaft being welded.

As can be seen in FIGS. 2 and 3, each of hub segments 30 comprise, at any longitudinal location, an angular segment of the total hub section 32. Each hub segment 30 comprises material within an angle alpha ($\alpha$) between a first hub segment face 34 and a second hub segment face 36. Preferably, the angle alpha ($\beta$) is equal in all three hub segments (30, 30', and 30") and is equal longitudinally in each machined blank (24, 24', and 24"). In such cases, angle alpha ($\alpha$) substantially corresponds to three hundred sixty degrees divided by N (360°/N), where N is the number of hub segments in the total hub section 32 of a propeller 38. For high speed marine propellers, we prefer to use either three (3) hub segments 30 (as illustrated in FIGS. 2, 3, and 4) or two (2) hub segments 40 (as illustrated in FIGS. 5, 6, and 7 below). In such cases, the angle alpha ($\alpha$) is normally 120° or 180°, respectively.

As can be deduced from FIG. 3 and as clearly noted in FIG. 4, the angular hub segment 30 spirals about the longitudinal axis X, from the front F to the rear R of propeller 38, by an angle beta ($\beta$). For convenience, we generally provide propellers 38 wherein the angle alpha ($\alpha$), the angular measure of material provided in each hub segment (here, 30, 30', and 30") is equal to the angle beta ($\beta$), the angular measure of rotation of each hub segment from the rear R to the front F of the propeller 38. Undoubtedly, with modern programmable machine tools, variations from such preferred uniform dimensions can be provided yet still attain the advantages of our invention, and therefore such modifications which fall within the general scope of this invention, and which generally utilize the instructions provided herein, such as various angles alpha ($\alpha$) and beta ($\beta$) or variations therein, are intended to fall within the range of legal equivalents of the invention as claimed.

Further, it can be readily appreciated from FIG. 3 that we prefer the use of complimentary hub sections (here, 30, 30', and 30"), which have approximately parallel complimentary spiral mating hub segment faces (e.g., 34 and 36 in hub 30) which extend preferably radially outward from the shaft accommodating interior wall portion 42, along the longitudinal axis X. These mating hub segment faces 34 and 36 are preferably advanced (rotated) by smooth, gradual rotation of the segment of angle alpha ($\alpha$) (here shown in a counterclockwise direction) from front F to rear R of the propeller 38, so as to maintain a constant angle alpha ($\alpha$) between the hub segment faces 34 and 36 as the spiral hub segment 30 is rotated through an angle beta ($\beta$) from rear R to front F.

It will be appreciated that one novel aspect of the invention is the provision of spiral hub segments, which necessarily provide for a longer contact surface between the segments. Accordingly, the joints between the segments are longer and are otherwise stronger than the joints that would result from a weld between straight (un-spiraled) hub segments.

Also, no useful purpose would be served by going into the details of the shape of the propeller blade portions 26, 26' and 26" since its significance is primarily that such shape be of a design which may be effectively constructed by the press forging technique. The other details of the exact shape are normally selected by a design engineer for achieving a specific performance objective, as will be understood by those of ordinary skill in the art and to which this detailed specification is addressed.

As can be visualized from FIG. 3, the mating hub segment faces (34 and 36 in hub segment 30) are then welded together to form a one-piece, high strength propeller 34. A preferred method of welding is use of electron beam welding. With electron beam welding, the hub segment faces 34 and 36 of a first hub segment 30 are joined with the complimentary hub segment faces 34' and 36' of a second hub segment 30' and with the hub segment faces 34" and 36" of a third hub segment 30". By examination of FIG. 3, it can be appreciated that hub segments 30 and 30' are joined along the spiral weld joint 50, that hub segments 30 and 30" are joined along the spiral weld joint 52, and that hub segments 30' and 30" are joined along the spiral weld joint 54.

Electron beam welding involves the use of a high energy density electron beam that is strongly focused on the materials to be joined, and which bombards the joint to be welded with an intense beam of electrons that have been accelerated up to velocities of 0.3 to 0.7 times the speed of light, normally between 25 and 200 kV. As the electrons impact and penetrate into the workpiece on which they are impinging, the weld joint interface surfaces, namely joints 50 (face 36 to face 34'), 52 (face 36' to face 34"), and 54 (face 36" to face 34), melt and produce the weld joint coalescence desired. Generally, electron beam welding results in a joint that is at least equal to or superior to that produced by other welding techniques, for example the commonly used GTAW (gas tungsten arc welding) process. Since the total kinetic energy of the electrons can be concentrated into a small area along the joints 50, 52, and 54, high power densities can be achieved. The electron beam welding process is able to make welds that are deeper and narrower than arc welds, with a total heat input that is much lower than that required in arc welding. Also, the necessity for multiple pass welds is eliminated since the electron beam welding method is able to achieve a high weld-to-depth ratio. More importantly for the type of propellers which we normally manufacture, the lower heat input results in a narrow workpiece heat-affected zone, and thus noticeably less thermal effects result on the final propeller 38. In order to achieve the desired results, we have found it desirable to provide complimentary hub segment faces (36 to 34', 35' to 34", and 36" to 34) which are substantially parallel at any longitudinal position and which are provided spaced apart approximately ³⁄₁₀₀₀ths of an inch.

FIG. 4 provides a rear view of the fully assembled propeller 38 first shown in FIG. 3. Here, the distinction between the angle alpha (α) and the angle beta (β) can be seen. The angle alpha (α) is the angle of a propeller hub segment at any longitudinal location along the X axis. The angle beta (β) is the angle of rotation of the edge surface of a segment (such as surface 36 of hub segment 30) from the rear R to the front F of the propeller 38.

FIG. 5 illustrates the rear end view of a second embodiment of our invention, namely a two bladed propeller 46 with two hub segments, 47 and 48. The shaft receiving bore 50 has a relatively small diameter $D^R$ at the rear end R to accommodate the narrow end of the preferably tapered shaft 52, compared to the larger diameter $D^F$ at the front end F of the propeller 46 as noted in FIG. 7 below.

Turning now to FIG. 6, one important technique involved in electron beam welding of the propeller 46 to a shaft 52 is illustrated. When electron beam welding is utilized, it is normally desirable or required that an air expansion space be provided somewhere along the two surfaces which are to be joined. As shown in FIG. 6, the air space is provided in the form of a small longitudinal cavity 54, which cavity is defined between a first borehole wall 56 on the preferably tapered shaft 52 and wall 58 on hub segment 47, and by cavity 62, which cavity is defined by a second borehole wall 64 on the shaft 52 and by wall 68 on hub segment 48.

Attention is now directed to FIGS. 6 and 7. FIG. 6 shows a rear end view of propeller 46 similar to the view of FIG. 5, but showing further hidden details which occur further forward. The tapered shaft 52 is preferably provided in a generally truncated cone end wall section 70 shape. The tapered shaft 52 is ideally welded in place by use of the electron beam welding technique just discussed.

Figure 8:
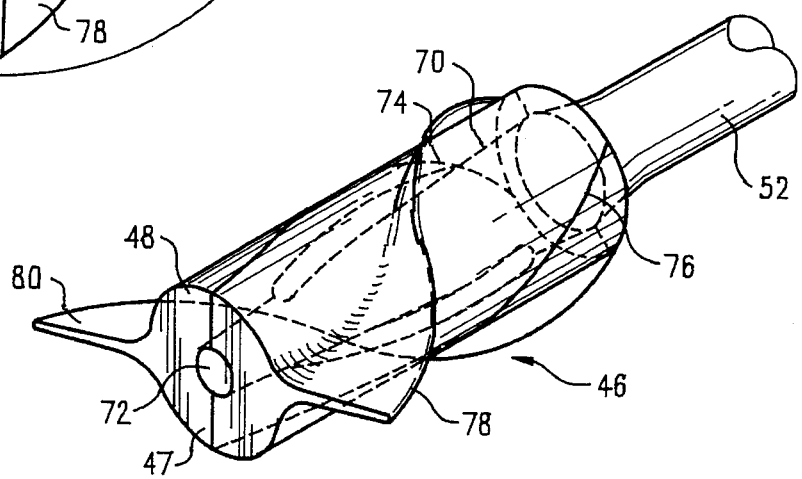
FIG. 8 is a perspective view of the fully assembled propeller with integral tapered drive shaft as first illustrated in FIG. 6 above.

A fully assembled perspective view of the propeller 46 shown in FIGS. 5, 6, and 7 above is now provided in FIG. 8. The small diameter rear 72 of shaft 52 is seen as a result of the tapered wall section 70 shape provided. The spiral shaped weld joint interfaces 74 and 76 are seen between hub sections 47 and 48. Blades 78 and 80 are provided.

Figure 9:
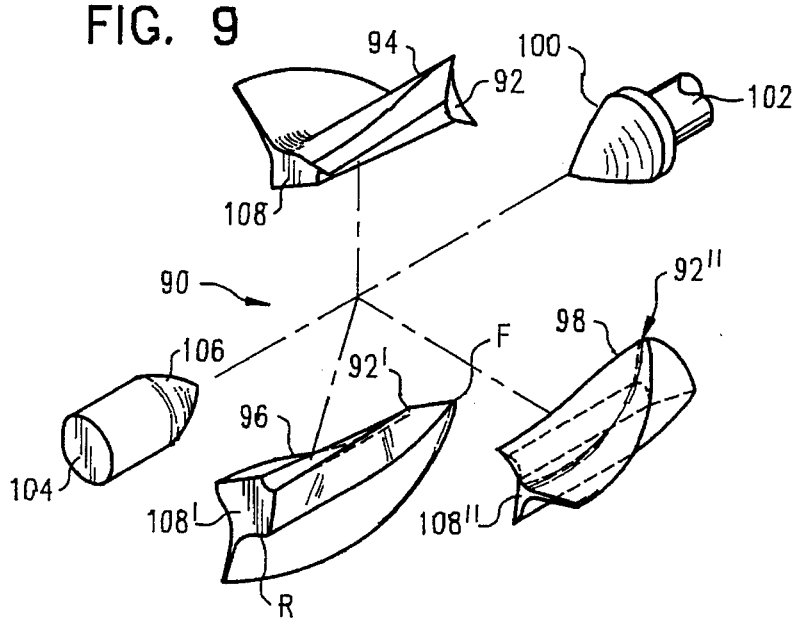
FIG. 9 is an exploded perspective view of a three bladed propeller together with a friction welded drive shaft and rear stud.

Turning now to FIG. 9, an exploded view of another embodiment of our invention is illustrated. A three hub segment propeller 90 is provided. The propeller 90 has an inward sloping tapered wall 92, (and corresponding walls 92', and 92") at the front of each of hub segments 94, 96, and 98, respectively. We prefer to use a taper of approximately 45°. A complimentary tapered wall 100 is provided at the rear of drive shaft 102. In addition, the unfinished stud 104 has a tapered end 106 which is complimentary to tapered wall 108 (and corresponding walls 108' and 108") on the rear end R of hub segments 94, 96, and 98 when combined into a total hub section 110. It can readily be appreciated that similar construction will work for propellers assembled with more or less hub segments than the three segment version which is illustrated.

Figure 10:
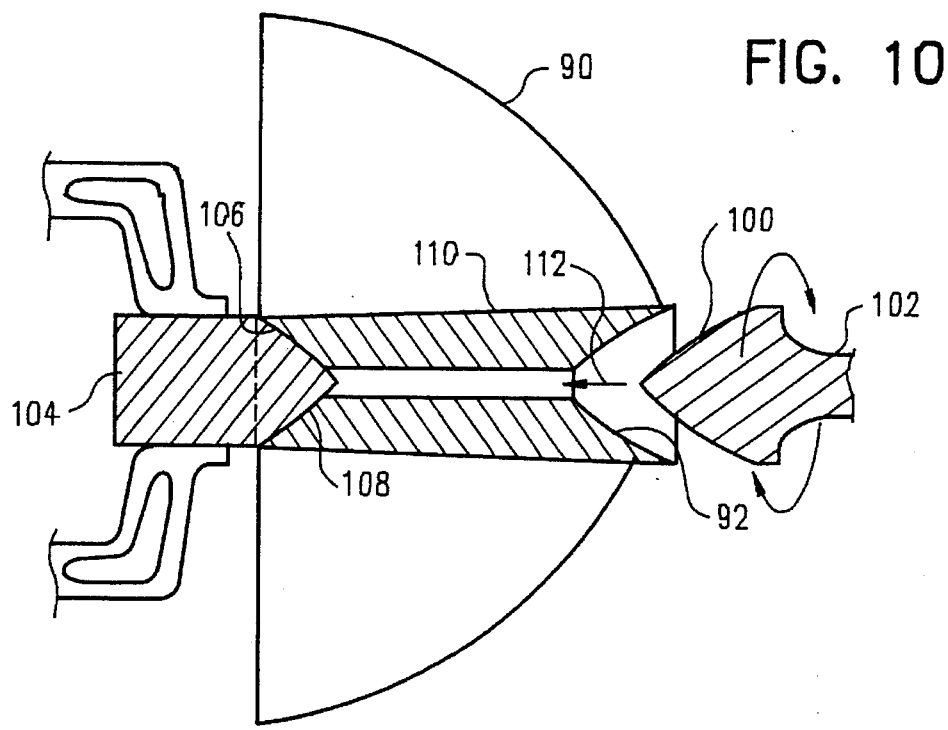
FIG. 10 is a diagrammatic view of the friction welding process utilized for attachment of the drive shaft to the propeller first illustrated in FIG. 9.

A method for fabricating the propeller just illustrated in FIG. 9 is depicted in FIG. 10. The stud 104 is first welded to the total hub section 110. Then, the stud 104 is securely grasped, holding the propeller 90 stationary. The shaft 102 is rapidly revolved and then forced rearward in the direction of reference arrow 112, to cause the rapidly rotating taper 100 at the rear of shaft 102 to impact against tapered wall 92 of the total hub 110. The heat for welding tapered wall 92 of the total hub 110 to the taper 100 on the shaft 102 is produced by direct conversion of mechanical energy to thermal energy at the interface of the parts, preferably without application of electrical energy or heat from other sources to either of the parts being fused. The total hub 110 is held stationary and taper 100 rotated against taper 92 until the interface reaches welding temperature, and then the rotation is stopped. The frictional heat developed at the interface rapidly raises the temperature of the workpieces over a very short axial distance to values approaching the melting range. Welding occurs under the influence of pressure that is applied while the heated zone is in the plastic temperature range.

Figure 11:
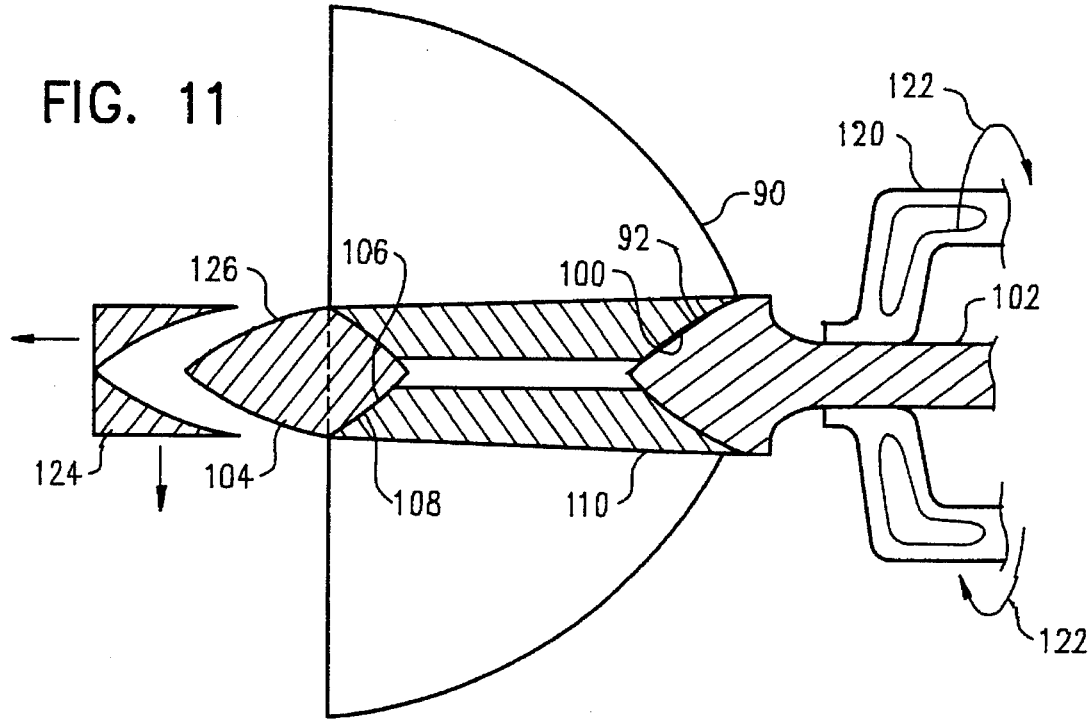
FIG. 11 is a diagrammatic view of the step of machining the stud provided at the rear of the propeller into a tapered, low drag end stud cap.

FIG. 11 shows the next step in the just described friction welding process. The assembled and fused shaft 102 and propeller 90 are grasped by a suitable clamping device 120 and turned, such as in the direction of reference arrows 122. Stud 104 has separated therefrom by a machining process the unwanted material 124 (usually by rotating lathe or the like, rather than removal in block form). This finishing process leaves a hydrodynamically shaped end cap 126 section on stud 104 at the rear of propeller 90.

Figure 12:
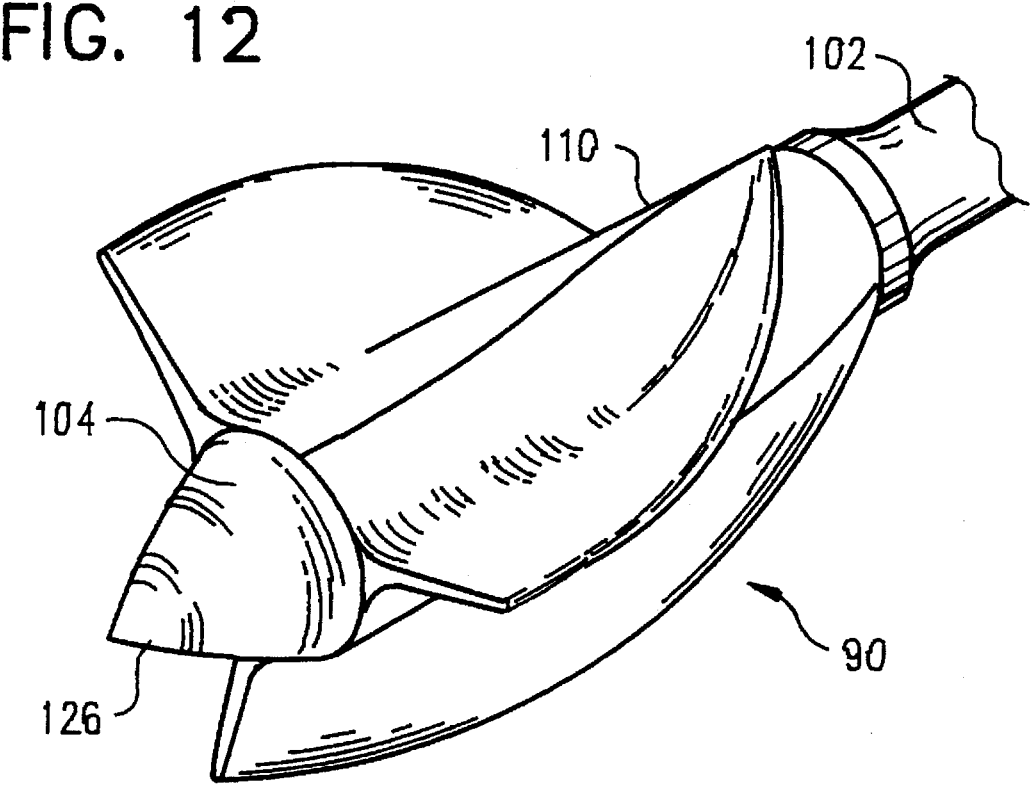
FIG. 12 is a perspective view of a fully assembled propeller with a friction welded integral drive shaft and end stud cap.

Finally, a perspective view of the fully assembled propeller 90 is provided in FIG. 12. The propeller 90 has a fusion welded drive shaft 102 attached thereto at the front end thereof, and a hydrodynamically shaped cap 126 at the rear thereof. The total hub 110 has been assembled by joining three complimentary angular hub segments 94, 96, and 98 together by using the spiral welding technique described above. As a result, an exemplary propeller and shaft assembly is provided.

Therefore, it is to be appreciated that the propeller and method of making the same which is provided by way of the present invention is a significant improvement in the state of the art of high speed marine propellers. Our propeller is of high strength, when compared to cast propellers of comparable size.

It will be readily apparent to the reader that the present invention may be easily adapted to other embodiments incorporating the concepts taught herein. Accordingly, the present figures are shown by way of example only and not in any way a limitation. Thus, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalences of the claims are therefore intended to be embraced therein.

We claim:

1. A method for fabrication of a propeller suitable for being driven by a shaft, said propeller of a selected shape and with N individual propeller blades, said propeller having a front and a rear and a longitudinal axis therebetween, and said propeller being comprised of N hub segment portions, said method comprising the steps of:

(a) press forging blanks of each of said N blades within a press forging mold to a shape at least roughly corresponding to the desired final size and shape of said blades, each of said blanks having a hub portion with integral blade portion;

(b) machining said hub portion of each blank into a hub segment, said hub segments
      (i) each comprising a spiraling, angular segmented shape having a first face and a second face located at a preselected segment angle alpha ($\alpha$) from said first face at any location along the longitudinal axis of said propeller, and
      (ii wherein said first face of said angular segmented shape of said hub section rotates about said longitudinal axis X of said propeller by an angle beta ($\beta$) from said rear to said front of said propeller, (c) securing each of said N hub sections in a closely spaced relationship for welding each of N hub segments to the hub sections adjacent thereto; and (d) welding adjacent hub sections each to the other to form a total hub section.

2. The method as set forth in claim 1, wherein said angle alpha ($\alpha$) is maintained approximately equal at all longitudinal positions in each of said N hub segments.

3. The method as set forth in claim 2, wherein said angle beta ($\beta$) is approximately equal to said angle alpha ($\alpha$).

4. The method as set forth in claim 1, wherein the step of welding comprises use of an electron beam welding process.

5. The method of claim 1, further comprising the step of friction welding said propeller to said driving shaft.

6. The method as set forth in claim 5, wherein the step of friction welding said propeller to said driving shaft is accomplished by rotating said shaft and pressing said shaft against the propeller hub segments which have been welded together to form a total hub section.

7. The method as set forth in claim 5, further comprising the step of welding a stud into the rear of said propeller.

8. The method as set forth in claim 7, further comprising the step of machining said stud into a hydronamically smooth rear end cap.

9. The method as set forth in claim 1, wherein said driving shaft comprises a generally truncated cone shape rear end portion, and further including the step of attaching said shaft to said propeller by electron beam welding.

* * * * *